Patented June 15, 1937

2,083,550

UNITED STATES PATENT OFFICE 2,083,550

MANUFACTURE OF VULCANIZED ORGANIC ISOCOLLOIDS

László Auer, Budapest, Hungary, assignor to J. Randolph Newman, Washington, D. C., as trustee No Drawing. Application June 13, 1929, Serial No. 370,733. Renewed February 18, 1936. In Great Britain June 13, 1928

18 Claims. (Cl. 106—23)

This invention relates to the manufacture of vulcanized organic isocolloids and it comprises improved methods of making sulphurized or vulcanized organic isocolloids, particularly those containing high molecular acids and their derivatives, wherein ordinary, bodied or modified fatty oils and like organic isocolloids capable of being sulphurized, are mixed with sulphur or sulphur-containing vulcanizing agents, the mixture is heated to vulcanizing temperatures and a current of steam passed through the heated mixture during the sulphurization thereof, the vulcanized product being sometimes emulsified, while still hot and fluid, in an aqueous liquid with or without the aid of a current of steam, and it also comprises the improved sulphurized or vulcanized organic isocolloids and the aqueous emulsions thereof, so obtained, all as more fully hereinafter described and as claimed.

It is well known that fatty oils and like vulcanizable oils, resins, etc., may be vulcanized or sulphurized by mixing them with sulphur and heating the mixture to suitable temperatures. However, it is quite difficult to consistently obtain good products of uniform quality. In many cases, the products obtained are too sticky (tacky) and otherwise undesirable, as to odor, etc., considerable hydrogen sulphide ($H_2S$) being formed in many instances.

I have now found that by passing or blowing a current of steam through the heated mixture or sulphurized products, improved results are obtained. The vulcanization or sulphurization is easier and better and superior products are produced. In the present methods, vulcanization accelerators, such as tetra-ethyl-thiuram-disulphide, mercaptobenzathiazole, etc., and activators thereof, such as zinc oxide, may be employed to facilitate the action of the sulphur. In this way, vulcanization is easily obtained even at moderate temperatures and such temperatures may be here employed.

The present improved methods may be employed to sulphurize or vulcanize many types of organic isocolloids with advantage and is not limited to the vulcanization of the usual fatty oils, although it is particularly advantageous with such oils. In my co-pending application Ser. No. 143,786 filed October 23, 1926 and the divisions and continuations thereof, such as Ser. No. 359,425, etc., I have given many oils, fatty or mineral, resins, etc., as illustrative of organic isocolloids and described methods of converting them into modified organic isocolloids or compositions. The other related applications are Ser. Nos. 273,159; 273,160; 359,424; 359,427 and 359,428. These modified isocolloid products are organic isocolloids generally which have undergone a modifying treatment with gases, electrolytes (polar compounds) etc., as described in the said applications. As stated in the parent application, Ser. No. 143,786, in the generic procedure of such methods the organic isocolloid is modified by dispersing or dissolving a minor amount of an electrolyte or polar compound therein, at room temperature or elevated temperatures. When temperatures of 200° C. or above are employed, particularly with fatty oils, and the heating continued after the polar compound is dissolved, the composition may also become heat-bodied, as specifically shown in Ser. No. 359,425, the main division of Ser. No. 143,-786. Such modified products are more or less thermoplastic and are useful here, Example 1 given post being illustrative of their use in the present invention. As specifically stated in the said applications, such products may be vulcanized or sulphurized with sulphur or sulphur compounds. By using the present improved methods of sulphurization better vulcanized products are obtained from them.

As stated in Ser. No. 359,425, valuable specific oils for the said purposes are tung oil, linseed oil, castor oil, fish oils (train oils), poppyseed oil, sunflower oil, rapeseed oil, walnut oil, pine oil, corn oil, olive oil, etc., products of varying hardness or softness being obtained with various modifying agents.

Thus as the organic isocolloid, in the present invention, there may be employed various oils, resins, etc., such as vegetable and animal oils and their acids, resins, fats, synthetic resins, containing fatty or resin or naphthenic acids and their derivatives. Likewise, as stated ante, the bodied or modified products obtained from them (such organic isocolloids) may also be employed in the present methods, to obtain the sulphurized products. I do not include rubber itself, in the materials here used, but I do find that my new process may be advantageously applied to the thermoplastic products derived from rubber by means of and with the aid of electrolytes. These thermoplastic products are modified organic isocolloids which are quite different from rubber itself. The production of these thermoplastic products from rubber may be effected in a manner similar to that by which I have produced modified products from organic isocolloids of the type hereinbefore mentioned.

I have found that frequently in the vulcanization of such organic isocolloids with sulphur or sulphur chloride in the manner stated, the vulcanized products are tacky or sticky. For many purposes this stickiness or tackiness is not wanted. During vulcanization there is a tendency to develop tackiness and stickiness which may be due to some incidental decomposition of the starting materials. I have further found that the tendency may be overcome and eliminated, and non-tacky vulcanizates produced, if during vulcanization or after vulcanization the material is contacted with steam; that is, if the materials be intimately contacted with steam during some stage of the process tackiness does not develop or is removed; and satisfactory products free from tackiness or stickiness can be obtained.

As stated, my new process of vulcanization wherein the vulcanization is supported by the action of steam, may not only be applied to vulcanization of organic isocolloids themselves but may also be used in vulcanizing modified isocolloid bodies obtained from such original isocolloids by the process set forth in the above identified copending application. My new vulcanizing process is especially advantageous when applied to these new modified isocolloid bodies.

In a general way, the new modified isocolloid bodies may be obtained by mixing organic isocolloid substance with a modifying agent and then heating the mixture until the modifying agent is dispersed or dissolved in the organic isocolloid and a substantially modified isocolloid body or product is obtained. In such processes of modification it is advantageous to use reduced pressure, that is, effect the heating under vacuum. The modified products thus produced are different from the starting materials and have different physical properties. They are themselves new and useful, as is disclosed in the above identified applications. If such modified isocolloid bodies are vulcanized, they are further changed and other new and useful and different products having other desired physical properties are produced.

The present method of vulcanization is advantageous in producing these new and different products.

In my copending application Serial No. 143,786 I have disclosed processes of producing modified isocolloids by the general method indicated ante, wherein the said isocolloids, such as fatty oils, resins and mineral oils, are modified by heating with an electrolyte as the modifying agent; the temperature being advantageously between 300 and 350° C. and the heating being effected under vacuum in producing the most advantageous products. In that application I have specifically disclosed metallic salts or inorganic and organic acids as effective modifying agents of the electrolyte type.

In my copending application Serial No. 273,159 I have disclosed making modified products from isocolloids containing unsaturated carbon compounds such as mineral oils containing naphthenic acids, fatty oils, resins, asphalts, goudrons, tarry distillation residues and rubber and rubber-like products, by a somewhat similar process. As disclosed the modifying agents may be electrolytes as in Serial No. 143,786. Also, I have disclosed in my copending application Serial No. 273,159 as modifying agents such compounds as organic acids, inorganic acids, metallic salts of organic acids, metallic salts of inorganic acids, organic salts of organic acids, organic salts of inorganic acids, metallic-organic compounds, metal oxides, metallic hydroxides and metal organic bases. In Serial No. 273,159 I further disclose that dispersion of the modifying agents may be facilitated and assisted by using certain organic solvents to carry the modifying agent into the isocolloid substance. In using such organic solvents the mixture is usually heated under refluxing conditions until the desired dispersion is obtained and then the organic solvent is removed, the heating being continued after removal of the solvent if at that time the desired modification has not been obtained. By the use of organic solvents it is possible in many cases to use a somewhat lower temperature to obtain dispersion of the modifying agent and the desired modification of the isocolloids. In that application I specifically disclosed sodium amylate, sodium chlorate, sodium iodide, stannic tetraphenyl, and trichloracetic acid as typical examples of the classes of modifying agents given ante. These are used to modify Chinese wood oil, rubber, rosin and asphalt, these substances being typical examples of the general classes of isocolloids which may be modified by the process of that application.

My copending application Serial No. 359,425 likewise discloses a process for making modified bodies from certain isocolloids such as natural and artificial products containing unsaturated carbon compounds; for instance, fatty oils, rubber, resins, mineral oils, asphalts, pitches, and the like. This application discloses processes wherein such substances are mixed with 2 to 10 per cent of certain modifying agents and the mixture heated to a temperature between 100 and 310° C. until the modifying agent is dispersed in the isocolloid substance and a substantially modified product produced; the heating being advantageously effected under vacuum. In this application in addition to the modifying agents disclosed in my prior application mentioned ante there are disclosed a large number of other organic compounds which may be advantageously used as modifying agents. There is generically disclosed that class of compounds which comprise within the molecule an acidic inorganic and an organic residue. There are disclosed many specific compounds typical of the following subgeneric classes, for instance, organic halogen compounds, organic sulphonic acids, their halides and esters, esters of inorganic acids, inorganic salts of organic bases and organic nitro compounds.

In my copending application Serial No. 359,426 I have disclosed another and different process for making modified isocolloid bodies. In this application the modifying agents are certain metallic peroxides, for instance, the peroxides of magnesium, zinc, barium, strontium, calcium, sodium, cesium, nickel, and bismuth. These modifying agents are used to modify isocolloid materials such as fatty oils, resins, synthetic resins containing natural resins, naphthenic acids, fats, waxes and the like. The metallic peroxides are mixed with such isocolloid substances and the mixture heated to a temperature advantageously between 200 and 300° C., the heating being advantageously effected under vacuum. Also that application discloses using in addition to and in conjunction with the metallic peroxides, electrolytes such as are disclosed in my application Serial No. 143,786.

In my application Serial No. 359,427 I have disclosed still another and different process of making modified isocolloid bodies. There are disclosed processes wherein certain isocolloid substances containing high molecular unsaturated acids and their derivatives, such as fatty oils, resins, fats, naphthenic acids, waxes and synthetic resins containing natural resins, are modified by means of alkali metals, alkali metal oxides and alkali metal hydroxides. The isocolloid substances are mixed with these modifying agents and the mixture heated to a temperature between 200 and 300° C., the heating being advantageously effected under vacuum. In this application I have also disclosed using in conjunction with the said metals, oxides and hydroxides, a metallic peroxide. In such cases the modification is effected by means of both the peroxide and the other modifying agents.

In my application Serial No. 359,424 I have disclosed processes of making modified isocolloid bodies wherein all or part of the modification is effected while the isocolloid substance is maintained in an emulsified state in an aqueous medium. In this application, any of the isocolloid substances or the modifying agents disclosed in my other copending applications as above identified, may be used. Within the generic scope of the processes disclosed in these applications, there are several important modifications. For instance the isocolloid substance may be partially modified as in any of the processes given ante, the partially modified body emulsified in an aqueous medium and then maintained in the emulsified state while the modification initially started is carried to completion. Again, the isocolloid substance may be modified as in any of the prior processes and the modified body emulsified in an aqueous medium, then modifying agents of the type described added to the aqueous phase of the emulsion and a further modification of the modified isocolloid body effected by means of these added modifying agents while the whole system is maintained in the emulsified state. In another application of the generic invention of that application, the isocolloid substances may be first emulsified in an aqueous medium, then the hereinbefore described modifying agents added to the aqueous emulsion thus obtained and an isocolloid substance modified by means of these modifying agents while maintained in emulsified state. In such procedures all of the modification is effected while the system is in the emulsified state. The modifying agents such as described in my above entitled applications may be used to effect this further modification either completely or partially while the isocolloid substance is maintained in the emulsified state. For instance the modifying agents disclosed in Serial Nos. 143,786 and 359,425 may be added to the emulsions and the emulsions maintained under suitable conditions as to temperature and pressure until the desired modification is effected. It has been found that the modified isocolloid bodies obtained from the emulsions, by coagulation, precipitation or other means of separation are substantially different from those prepared without the emulsifying step. It seems that the emulsifying step has some effect upon the structure and the course of the modification so that different products having certain physical properties which are advantageous in certain usages are obtained.

I have found that any and all of the modified products, the modified isocolloid bodies obtained by the processes of my prior applications as outlined above, may be advantageously vulcanized by the present process to give new, useful and advantageous vulcanized modified isocolloid bodies. The products so obtained are valuable in the arts. Their physical properties are influenced by the procedures followed. The way in which the isocolloid substance has been initially modified and the modifying agent dispersed therein, affect the vulcanization process and the reactions involved. In each particular case, the product is somewhat influenced by the exact relation between these factors.

Not only is it possible to produce solid vulcanized modified bodies which are new and useful in the arts, but it is also possible to directly produce highly concentrated aqueous emulsions of these vulcanized products by my process. This is advantageous. To produce satisfactory emulsions of vulcanized products it is generally necessary to use a rather large amount of water. In many cases only dilute emulsions can be obtained directly. To obtain concentrated emulsions it is necessary to remove the excess of water. In many cases this is difficult and the desired concentration cannot be obtained without breaking the emulsion. But in my present process by condensing the steam which is passed through the mass during vulcanization, I may directly obtain highly concentrated emulsions. Also the vulcanized products obtained in my process may be easily dispersed in water to give satisfactory emulsions.

The treatment with steam may be carried out either at the same time as the vulcanization or after the vulcanization process as an after-treatment. Such after-treatment is especially advantageous if the ordinary vulcanization yields a sticky product. During the steam-treatment such stickiness will be eliminated and the treated materials will be converted into more valuable products.

The steam so used in the present processes should be either saturated or superheated, in accordance with the particular aim of the reaction. The steam is led into the reaction mass. In this way, several advantageous results are obtained. The current of steam has several actions, all advantageous. For one thing, it agitates the mixture and intimately mixes the reacting materials. Also, the steam assists in maintaining the desired temperature; it, so to speak, supports the heat treatment. Hence, uniform reaction and uniform products are obtained here. Without the use of steam as stated, such results are not obtained.

The vulcanization by the aid of steam is a very useful method of making vulcanized oil emulsions. The steam condensing in the reaction mixture is very suitable to produce emulsions of the vulcanized materials, particularly with saturated steam as in Example 1, post. The emulsification is obtained at temperatures slightly below the condensing point of the steam while the mixture is hot and fluid. The efficiency of the emulsification is supported by the fact that the emulsification occurs at the same time as the vulcanization, and it is not necessary to emulsify the finished vulcanized product. The new process is applicable, also, in such cases in which the products are under other conditions very difficultly emulsifiable. It is further possible by the application of the new method to obtain an emulsion with quite a definite concentration (also with high dry content) by regulating the condensation of the steam with the aid of maintaining a certain reaction temperature and using a steam of a certain pressure. Therefore, it is possible to obtain immediately concentrated emulsions without a concentrating process. If the amount of condensed steam is not enough to form the emulsion required, it is advisable to add the necessary amount of water or a portion of it to the reaction mixture, before or during vulcanization. Also as shown in Example 2, after the product has been partially cooled, say to below 100° C., and water added, a current of steam may be blown into the mixture to produce an emulsion of the desired concentration.

The addition of emulsifying agents, protective colloids, and fillers or pigments at any stage of the reaction may be advisable in certain cases. The properties of the resulting products may be further affected by adding organic solvents to the reaction mixture.

An important advantage of the products obtained by the present process is their light color and transparency. The process yields non-sticky products, and the process, as mentioned, is also useful to eliminate stickiness of vulcanizates.

The products of the new process are useful for all such purposes for which similar products are used. Thus, for instance the vulcanized emulsions of fatty oils are useful for impregnating textiles, paper and other porous materials. One can separate the disperse phase of the emulsion by coagulation, or drying, or by dipping (in which case it is advantageous to coat the support with a coagulating agent). The separation of the disperse phase may be carried out also by ultrafiltration or electrophoresis. If in the event of electrodeposition no semipermeable supports are used, it is advantageous to work below the potential at which the water will be decomposed. Instead of using the obtained emulsions as such, one may mix them advantageously before practical use with natural rubber latex which may be, if necessary, previously vulcanized.

The new process may also be used in such cases, in which it is not desired to obtain completely vulcanized products but only partially vulcanized. That is, it is not necessary to fully or completely vulcanize the oils, etc., to the solid state, instead emulsions of partially vulcanized products can be obtained, if desired. When emulsions of completely vulcanized products are to be obtained, the vulcanized product is emulsified before it becomes solidified, this being done by condensing a part of the steam passing into the hot mass while fluid.

It should be pointed out that whereas crude (natural) rubber is not included within the scope of this invention, modified rubber products, the physical properties of which were modified by modifying agents, may be one of the starting materials of the new process.

In the case of modified isocolloids, in the preparation of which a water soluble reagent was used, the addition of the emulsifying agent may be omitted.

*Example No. 1.*—In this example, a modified fatty oil, modified with an alkali metal sulphide and obtainable by the methods described in Ser. Nos. 143,786 and 359,425, is employed. The starting material, here used, is a linseed oil, solidified in vacuo above 200° C. with sodium sulphide, $Na_2S$.

100 grams of this modified linseed oil, 1 gram of tetra-ethyl-thiuram-disulphide (vulcanization accelerator), 2 grams of colloidal zinc oxide (activator) and 10 grams of sulphur (vulcanizing agent) are heated together to 120° C. in an autoclave heated with a free flame. After this temperature is reached steam was caused to flow through the reaction mass agitating it vigorously. To avoid a vigorous condensation of the saturated steam used in the reaction vessel, the latter was heated slightly externally. It is advantageous to couple into the steam line between it and the reaction vessel a water trap acting to accumulate the water condensing in the steam line. After 3 hours' steam-treatment at 120° C., the mass was cooled. At a temperature of 40° C., 3 grams ammonium oleate, 2 grams conc. ammonia and 20 ccs. of a 5% casein solution were mixed into the mass, which contains itself 30–40% water. The casein solution should be ammoniacal. The obtained concentrated emulsion of vulcanized linseed oil may be useful for a variety of purposes, e. g. as compounding ingredient to rubber latex in the case of producing rubber articles by electrophoretical deposition.

*Example No. 2.*—1000 pts. of fish oil, 10 pts. of mercaptobenzthiazole, 20 parts of zinc oxide, 200 parts of sulphur and 40 parts of oleic acid are heated with stirring in an autoclave to 140° C. When this temperature is reached, superheated steam is blown through the vessel so as to maintain this temperature for 6 hours. After cooling to below 100° C., water is added as desired together with 10–20 parts of conc. ammonia and 5 parts of saponin. The mixture is steam blown at 100° C. for another half hour, giving an emulsion of the desired concentration, depending upon the amount of water used. It is advisable to use an apparatus with good stirring mechanism, and some satisfactory froth destroyer. The product may be used e. g. for the same purpose as the product of Example No. 1, as well as for impregnation of textiles.

I claim:

1. In the manufacture of vulcanized products from organic isocolloid materials, containing high molecular acids and their derivatives, and capable of being sulphurized, the process which comprises mixing the said material with a vulcanizing agent, heating the mixture to a vulcanizing temperature and simultaneously passing a current of steam through the so heated mixture.

2. In the manufacture of vulcanized products from fatty oils, the process which comprises mixing a fatty oil of the class consisting of raw oils and bodied, modified oils, with a vulcanizing agent, and then simultaneously heating the said mixture to a vulcanizing temperature and passing a current of steam therethrough.

3. The process of claim 1, wherein said vulcanizing agent is sulphur.

4. In the manufacture of vulcanized products from ordinary, unbodied fatty oils, the process which comprises mixing such fatty oil with sulphur and then simultaneously heating the mixture to a vulcanizing temperature and passing a current of steam therethrough.

5. The process of claim 4 wherein said mixture also contains a vulcanization accelerator, thus permitting vulcanization at relatively lower temperatures.

6. The process of claim 4 wherein said mixture also contains both a vulcanization accelerator and an activator thereof.

7. In the manufacture of vulcanized products from fatty oils and like organic isocolloids molten at their vulcanizing temperature and capable of being sulphurized, the said vulcanized products being in the form of aqueous emulsions, the process which comprises mixing the said fatty oil and the like with sulphur, externally heating the mixture to a vulcanizing temperature, passing a current of steam therethrough and condensing at least a part of said steam to produce an aqueous emulsion of the vulcanized product.

8. In the manufacture of aqueous emulsions of vulcanized products from fatty oils, the process which comprises mixing a fatty oil with an accelerator, an activator, sulphur and oleic acid, heating the mixture with stirring to a temperature between 120 and 140° C., maintaining the heated mixture at said temperature and passing a current of steam through the heated mixture until a vulcanized product is obtained, cooling the mixture to below 100° C., adding an aqueous mixture comprising concentrated ammonia and saponin, and passing a current of steam through the mixture thus obtained at a temperature at about 100° C. until an emulsion of the desired concentration is obtained.

9. In the manufacture of aqueous emulsions of vulcanized products from fatty oils, the process which comprises mixing together about 100 parts of fish oil, 1 part of mercaptobenzthiazole, 2 parts of zinc oxide, 20 parts of sulphur and 4 parts of oleic acid, heating the mixture with stirring to a temperature of about 140° C., maintaining the mixture at said temperature and passing a current of superheated steam through the heated mixture, until a vulcanized product is obtained, cooling the so treated mass to below 100° C., adding ten to twenty parts of concentrated ammonia, 5 parts of saponin and sufficient water to give the desired concentration in the emulsion and passing steam through the mixture thus obtained at about 100° C. until an emulsion of the vulcanized product is obtained.

10. In processes of vulcanizing fatty oils, the steps which comprise mixing a fatty oil, mercaptobenzthiazole, zinc oxide and sulphur, heating the mixture to a temperature of about 140° C. and passing a current of superheated steam through the heated mixture until a vulcanized product is obtained.

11. In the manufacture of vulcanized products from fatty oils, the process which comprises heating a fatty oil until a bodied, modified oil is obtained, mixing the said bodied oil with sulphur and a vulcanization accelerator, and then simultaneously heating the mixture to vulcanizing temperatures and passing a current of steam through the heated mixture until a vulcanized product is obtained.

12. The process of claim 2 wherein said fatty oil is a modified bodied fatty oil containing a minor amount of an inorganic polar compound dispersed therein.

13. The process of claim 1 wherein said isocolloid material is a modified isocolloid material containing a minor amount of a polar compound, said modified material being obtainable by dispersing said polar compound in said isocolloid material prior to said sulphurization.

14. In the manufacture of vulcanized modified fatty oils, the process which comprises forming a heat-bodied, modified linseed oil with the aid of sodium sulphide by heating linseed oil to above 200° C. in vacuo in the presence of said metal salt until such oil product is obtained, mixing 100 parts of said bodied, modified oil product with 10 parts of sulphur, 1 part of tetra-ethyl-thiuram-disulphide and 2 parts of zinc oxide, heating this mixture to about 120° C., passing a current of saturated steam into and through the so heated mixture until said vulcanized product is obtained.

15. In the manufacture of vulcanized modified fatty esters having a relatively high molecular weight, the steps which comprise bodying and modifying a fatty ester by mixing 2 to 10 parts of a metal salt with 100 parts of the fatty ester and heating the mixture to at least 200° C. until a bodied, modified product is obtained, mixing the bodied, modified product with sulphur and then simultaneously maintaining the mixture at vulcanizing temperatures and passing a current of steam into and through the hot material.

16. As an improvement in producing aqueous emulsions of sulphurized fatty oils obtained by heating the oil and sulphur, the improvement which comprises emulsifying the sulphurized product, while in a hot fluid condition, with an aqueous medium.

17. The process of claim 16 wherein said emulsification is effected at a temperature slightly below the condensing point of steam.

18. The process of claim 16 wherein the said emulsion is formed by passing a current of steam into and through the warm oil and condensing a part of the steam in situ.

LÁSZLÓ AUER.